US012614415B2

(12) United States Patent
Köstermann et al.

(10) Patent No.: US 12,614,415 B2
(45) Date of Patent: Apr. 28, 2026

(54) METHOD FOR STORING AND EVALUATING STATUS INFORMATION RECORDED WITHIN A V2X NETWORK

(71) Applicant: Volkswagen Aktiengesellschaft, Wolfsburg (DE)

(72) Inventors: Janis Köstermann, Berlin (DE); Hendrik Hoppmann, Braunschweig (DE); Jörg Voltmer, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 135 days.

(21) Appl. No.: 18/703,989

(22) PCT Filed: Oct. 20, 2022

(86) PCT No.: PCT/EP2022/079308
§ 371 (c)(1),
(2) Date: Apr. 23, 2024

(87) PCT Pub. No.: WO2023/072741
PCT Pub. Date: May 4, 2023

(65) Prior Publication Data

US 2024/0420517 A1 Dec. 19, 2024

(30) Foreign Application Priority Data

Oct. 25, 2021 (DE) .................................... 21204600

(51) Int. Cl.
*G07C 5/00* (2006.01)
*G07C 5/08* (2006.01)

(52) U.S. Cl.
CPC ........... *G07C 5/008* (2013.01); *G07C 5/0816* (2013.01)

(58) Field of Classification Search
CPC ... G07C 5/008; G07C 5/0816; H04L 2209/84; H04L 9/50; H04L 63/00; G08G 1/0116;
(Continued)

(56) References Cited

U.S. PATENT DOCUMENTS

2017/0078472 A1 3/2017 Ricci
2020/0307480 A1* 10/2020 Troia ...................... H04L 63/12
(Continued)

FOREIGN PATENT DOCUMENTS

MX 2017015956 A 6/2019

OTHER PUBLICATIONS

PCT/EP2022/079308. International Search Report (Feb. 2, 2023).
Corresponding EP Application No. 212046000.7. Extended Search Report (Apr. 20, 2022).

*Primary Examiner* — Michael V Kerrigan
(74) *Attorney, Agent, or Firm* — Peter Zura; LOZA & LOZA, LLP

(57) ABSTRACT

Technologies and techniques for assigning anonymized status information recorded by vehicles in a V2X network to respective vehicles when an irregular event such as an accident occurs. An anonymized assignment takes place by comparing the status information with vehicle information relating to vehicles involved in an irregular event. Therefore, despite the status information being in an anonymized form, when an irregular event occurs, the information is assigned to the individual vehicles and the event, in particular the accident, is thus reconstructed.

20 Claims, 4 Drawing Sheets

(58) Field of Classification Search
CPC .... G08G 1/0133; G08G 1/017; G08G 1/0112; H04W 4/44; H04W 4/90
See application file for complete search history.

(56) References Cited

U.S. PATENT DOCUMENTS

| | | | | |
|---|---|---|---|---|
| 2020/0394905 | A1 | 12/2020 | Bernhardt et al. | |
| 2021/0136572 | A1 | 5/2021 | Ingraham et al. | |
| 2021/0304592 | A1* | 9/2021 | Lepp | H04W 4/40 |
| 2023/0145574 | A1* | 5/2023 | Park | G07C 5/085<br>701/32.2 |

* cited by examiner

METHOD FOR STORING AND EVALUATING STATUS INFORMATION RECORDED WITHIN A V2X NETWORK

RELATED APPLICATIONS

The present application claims priority to International Patent Application No. PCT/EP2022/079308 to Köstermann et al., filed Oct. 20, 2022, titled "Method For Storing And Evaluating Status Information Recorded Within A V2X Network," which claims priority to European Pat. App. No. EP 21204600.7, filed Oct. 25, 2021, to Köstermann et al., the contents of each being incorporated by reference in their entirety herein.

TECHNICAL FIELD

The present disclosure relates to technologies and techniques for storing and evaluating status information detected within a V2X network and to an infrastructure unit, a roadside unit (RSU) or a server configured to carry out associated methods and processes. The present disclosure furthermore relates to technologies and techniques for operating a vehicle within a V2X network and to a vehicle configured to carry out associated methods and processes.

BACKGROUND

Today's vehicles detect status information related to the current operating state of the vehicle or to relevant ambient parameters via a plurality of sensors. For example, trip data, such as the speed or steering angle, can be detected as status information related to the vehicle. The status information can also relate to a characteristic, for example a situation, an intention or a special feature, of an occupant of the vehicle or a load being transported by the vehicle. This status information is transmitted to other members of the V2X network, in particular to other vehicles, within the scope of interconnected driving in the form of so-called V2X (vehicle-to-X) or C2X (car-to-X) messages.

For example, a vehicle can emit the status information that the occupant of the vehicle is a physician on his or her way to a patient. As a result, other road users are informed and can react to this special situation, even though the vehicle is not particularly discernible as a private passenger car from the outside. In another application example, a driver transporting fragile cargo can make other road users aware via corresponding status information. These road users can then forecast that the vehicle emitting the status information will not exceed a certain driving speed or will not pass, and are able to react in time, for example decelerate slowly, but at an early stage. In addition, for example, a warning could be issued regarding novice drivers or driving schools.

The status information emitted by the vehicles of the V2X network is also especially important in the case of an irregular event, such as an accident. Based on the status information of the vehicles that are involved in the accident or observed the accident, for example, it would be possible to reconstruct the details of the accident. This may in particular help to clarify which road user caused the accident. It may be relevant for this purpose whether a vehicle informed the other road users about a potential special characteristic, for example that it is transporting fragile cargo.

A reconstruction of the details of the accident makes it necessary to assign the status information to the individual vehicles. This, however, entails certain difficulties since V2X messages are highly anonymized. For example, a vehicle usually transmits the status information thereof together with an identifier. This identifier, however, changes continuously and cannot be traced back to a particular vehicle. For data protection reasons, this prevents the creation of movement profiles. When an irregular event occurs, such as an accident, it is thus, however, also not possible to assign the status information to the individual vehicles.

One conceivable solution is to always transmit an identifier that unambiguously identifies the particular vehicle together with the status information. This, however, would run counter to the notion of data protection and, in some jurisdictions, would not be permissible for this very reason, since it would thus be possible to create movement profiles. As an alternative, the status information could be permanently recorded in the vehicle itself. With this, at least the assignment of the status information to the particular vehicle would be ensured. In the event of an accident, this status information could then be read out. However, this is a complex process and could incidentally also enable the creation of a movement profile.

US 2021/304592 A1 describes a method for accident analysis, wherein initially an accident involving a first vehicle is recognized, and subsequently event data relating to the accident is collected from a second vehicle.

SUMMARY

Aspects of the present disclosure are directed to enhancing the state of the art and provide technologies and techniques for storing and evaluating status information detected within a V2X network, which makes it possible to assign the status information to the individual vehicles, at least when an irregular event occurs while adhering to high data protection requirements.

Some aspects of the present disclosure are provided in the subject matters of the independent claims, found below. Other aspects are disclosed in the subject matter of the respectively associated dependent claims.

In some examples, a method is disclosed for storing and evaluating status information detected within a V2X network. A set of status information may be assigned to at least one of the vehicles involved in an irregular event (e.g., accident) based on a comparison between the status information and the vehicle information. This allows the status information to be assigned to individual vehicles that are involved in an irregular event in a data protection-compliant manner, and in particular an unambiguous identifier can be ed with. Rather, a data assignment is only carried out subsequently when an irregular event occurs, such as an accident. The continuous, precautionary storage can remain completely anonymized. This will be described in detail hereafter.

In some examples, a method is disclosed of operating a vehicle within a V2X network. The method can be carried out by a vehicle of the V2X network, in particular together with the methods disclosed herein and may be carried out by an RSU and/or a server.

In some examples, a computer program is disclosed, including instructions which prompt an RSU to carry out any of the methods disclosed herein, when the instructions are being executed by a control unit of the RSU. In some examples, a computer program is disclosed, including instructions which prompt a server to carry out the methods disclosed herein when the instructions are being executed by a control unit of the server. In some examples, a computer program is disclosed, including instructions which prompt a vehicle to carry out methods disclosed herein when the instructions are being executed by a control unit of the vehicle.

In some examples, an infrastructure unit, a roadside unit (RSU) or a server in a V2X network is disclosed. The RSU and/or the server may be configured to carry out the methods disclosed herein. The RSU and/or the server comprise a communication unit for the data communication within the V2X network, a memory unit for recording data, and a control unit. The control unit is configured to activate the communication unit for receiving status information of a plurality of vehicles, to record the received status information in the memory unit in anonymized form, to detect or receive vehicle information about vehicles involved in an irregular event, and to assign a set of status information to at least one of the vehicles involved in the irregular event, based on a comparison between the status information and the vehicle information. With respect to further details, reference is made to the description of other aspect, which accordingly also apply to this aspect.

In some examples, a vehicle in a V2X network is disclosed, wherein the vehicle comprises a communication unit for the data communication within the V2X network, a sensor unit for detecting status information and vehicle information, a control unit which is configured to activate the sensor unit for detecting status information related to the vehicle and vehicle information, to activate the communication unit for transmitting the detected status information to an infrastructure unit, a roadside unit (RSU) or a server of the V2X network via a first message, to determine an irregular event with involvement of the vehicle, and to activate the communication unit for transmitting vehicle information associated with the irregular event to an infrastructure unit, a roadside unit (RSU) or a server of the V2X network so as to assign at least one set of status information to at least one vehicle involved in the irregular event, based on a comparison between the status information and the vehicle information. With respect to further details, reference is made to the description of other aspect of the present disclosure, which accordingly also apply to this aspect.

The various specific embodiments described in the present application can advantageously be combined with one another, unless they are implemented differently in the individual case.

DESCRIPTION OF THE DRAWINGS

The present disclosure will be described hereafter in exemplary embodiments based on the associated drawings. In the drawings.

DETAILED DESCRIPTION

Figure 1:
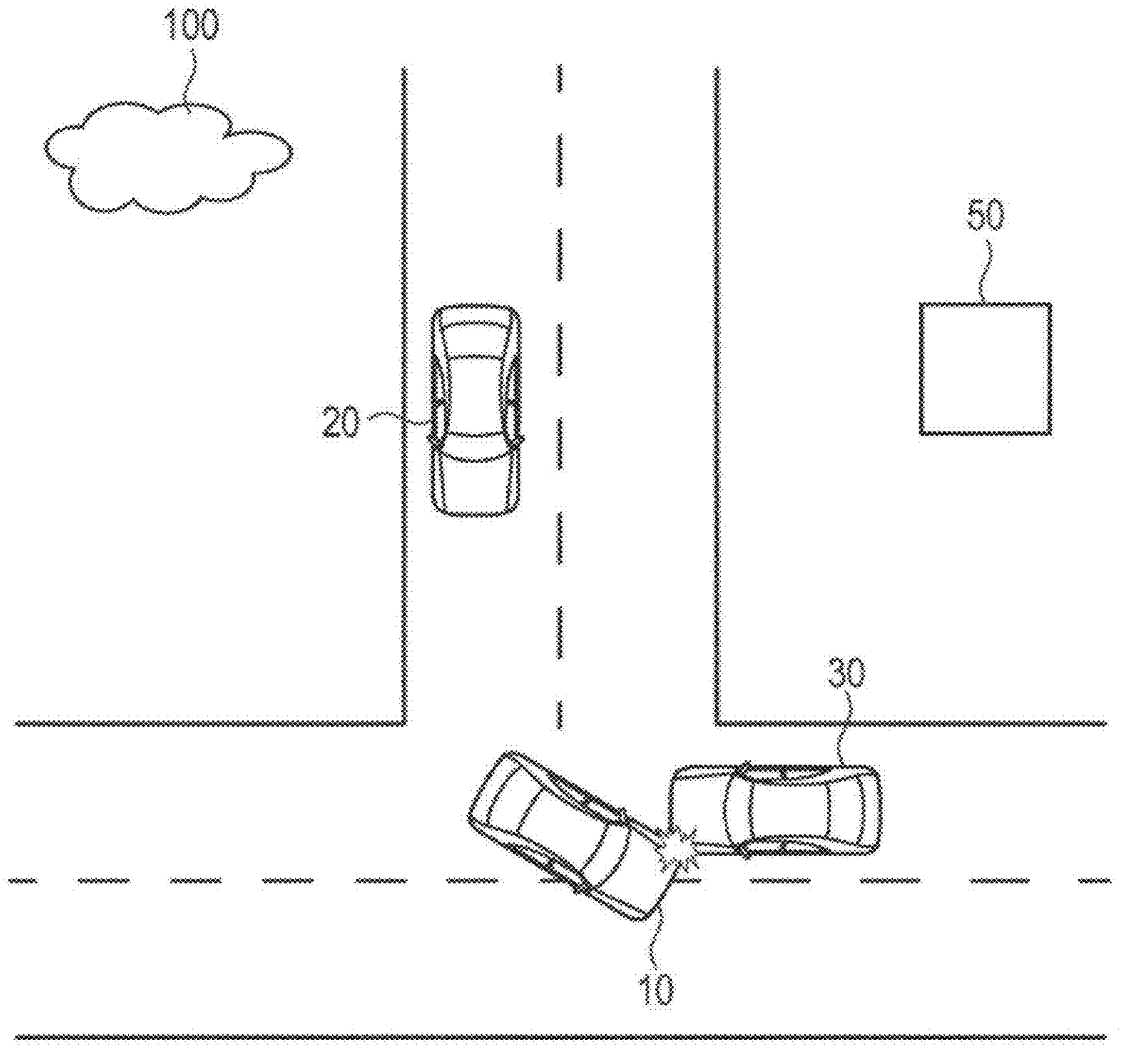
FIG. 1 shows a schematic illustration of a traffic situation with an accident as an irregular event in a view from above, according to some aspects of the present disclosure.

Unless indicated otherwise, identical objects are denoted by identical reference numerals.

In some examples described herein, status information of a plurality of vehicles is received, for example, from a roadside unit (RSU), as an infrastructure unit or a server. The RSU and/or the server may include a corresponding communication unit. The status information can relate to the current operating state of the vehicle or to relevant ambient parameters. The status information may relate to at least one characteristic of an occupant of the vehicle, cargo of the vehicle or to a characteristic of the vehicle itself, as will be described below. In particular, vehicle data, such as the speed, steering angle, driving direction, and position of the vehicle, can form such status information. The status information can be detected and transmitted by vehicles present in the V2X network. A characteristic of an occupant of the vehicle may be, for example, that the occupant is an emergency physician who is responding to an emergency with a private passenger car. A piece of status information "Physician on duty" may thus be generated and transmitted to other vehicles, so that these can be especially cautious. Accordingly, a vehicle could point out that it is transporting fragile cargo. In this way, possibly relevant information can be present in the RSU and/or the server for a later assignment. Communication in the V2X network, and in particular the transmission of the status information, can take place via WLANp or Cellular V2X, for example. This is especially efficient, in particular if a direct link exists between two network users.

The received status information may be recorded in a memory unit in anonymized form. The RSU and/or the server may include such a memory unit. The recorded status information can be cyclically deleted in some examples. Accordingly, the memory unit can be designed as a circular buffer. For each vehicle, a set of status information belonging to this vehicle can be recorded. The recording of the status information is carried out in an anonymized manner. The recorded status information may thus be considered anonymized status information. Anonymized means in particular that the status information does not include an (unambiguous) identifier which assigns the status information to the associated vehicle. The status information is preferably already received in anonymized form, that is, is already emitted from the vehicles in anonymized form. Particularly preferably, the status information is also anonymously detected by the particular vehicles, that is, without being assigned such an identifier. In other words, the status information is anonymized insofar as neither the status information itself nor possibly further received data encompasses an unambiguous vehicle ID which would allow a direct assignment of the data to the transmitting vehicle. In particular, no movement profiles can thus be created, and no direct conclusions as to who the driver is can be drawn. As a result, a higher level of data protection is ensured.

Vehicle information about vehicles involved in an irregular event, such as an accident, is detected or received. The vehicle information may include information related to the irregular event (accident). For the purposes of brevity, an irregular event will, in some cases, be referred to hereafter as "an accident" for illustrative effect. This should not be construed as a limiting disclosure in this regard. The vehicle information may include the point in time and/or location of the accident, changes in the speed or driving direction, end positions and/or the driving direction of individual vehicles involved in the accident. The vehicle information can be at least partly identical to the status information, that is, can form a subset of the status information. It is possible to receive vehicle information emitted by vehicles involved in the accident. For example, a vehicle involved in the accident can communicate that it was involved in an accident and can transmit at least a subset of the status information detected just prior to the accident, for example during the last 15 seconds prior to the accident, as vehicle information. It is also possible for vehicle information of the vehicles involved in the accident to be detected, for example, by the RSU itself. The RSU can comprise corresponding sensors, for example a camera directed at an intersection, which records an accident on the intersection. The RSU itself can also recognize an accident in this way. In this way, information about the accident is available.

In some examples, a least one set of status information is assigned to at least one of the vehicles involved in the irregular event based on a comparison between the status information and the vehicle information. Several or all available sets of status information can in each case be assigned to a vehicle involved in the irregular event. The set of status information denotes a volume of status information that belongs to an individual vehicle or has been detected thereby. Several such sets of status information may be received, as mentioned; however, since these are stored in an anonymized manner, these sets cannot be assigned to specific vehicles. As the inventors have recognized, an assignment is nonetheless possible, namely based on a comparison between the status information and the vehicle information. As a result of the comparison, the set, or each set, of recorded status information is assigned to a respective vehicle involved in the accident. The result of the comparison for each vehicle involved in the irregular event can thus be a set of status information that is assigned to the particular vehicle. In other words, as a result of this comparison between the status information and the vehicle information, the set of status information is assigned to the particular vehicle from which the set of status information stems. In this way, an indirect assignment of status information to a certain vehicle is carried out via a comparison of the vehicle information to the status information, that is, an assignment of status information to the particular vehicle, without drawing on an unambiguous identifier which, according to some aspects, is not present, which would correspond to a direct assignment. For example, the status information having the format X, header: "I am status information;" body" "Data element1, DE2, DE3, . . . , DEn," could be transmitted. So as to identify the relevant status information, a subset of the data elements would then be sufficient. This subset is the vehicle information, for example having the format Y, header; "I am vehicle information of vehicle A;" body: DE3, DE7, DE11, DE12. As a result of the comparison of the vehicle information to the status information, a set of status information belonging to vehicle A, that is, status info (vehicle A), can be ascertained. This will be described hereafter based on examples.

For example, the end positions and the driving directions of the vehicles involved in the accident can be present as vehicle information, either received from the vehicles involved in the accident themselves or detected by the RSU. For example, the speed, the steering angle and the driving direction of the vehicles involved in the accident can be present as a set of status information. As a result of the comparison according to some aspects, it is now possible to infer which set of status information belongs to which vehicle. The end position and the driving direction that the vehicle had just prior to the accident ideally only match one set of status information, that is, only one specific combination of speed, steering angle and driving direction. This allows the events of the accident to be inferred, at least as long as all or at least individual vehicles involved in the event have remained at the site of the accident. In addition, both the vehicle information and the status information can encompass specific vehicle properties, such as the length of the vehicle. In the case of an accident between two vehicles having differing lengths, it can thus be established without a doubt which data set belongs to which party of the accident. In this way, conclusions are drawn as to the vehicles involved in the event based on the comparison between the individual sets of status information and the vehicle information, and the accident can be reconstructed. After the assignment has been carried out, an evaluation of the details of the accident can be carried out, that is, in particular a clarification who is responsible. Here, it may be considered, for example, whether or not a vehicle involved in the accident shared a relevant characteristic of the occupant, such as "Physician on duty," or of the cargo, such as fragile cargo, as status information.

Aspects of the present disclosure can advantageously be implemented without changing the standards in use today (including the implementation in vehicles). In some examples, the implementation can in particular take place entirely in RSUs and can also work for existing vehicles, and more particularly without having to compromise in terms of data protection. By dispensing with the use of an unambiguous identifier, high requirements with regard to the data protection may be ensured. According to some aspects, a data assignment is only carried out subsequently if an accident/a crash has occurred. The continuous, precautionary storage remains completely anonymized. Despite adhering to these high data protection requirements, aspects of the present disclosure allow a subsequent assignment of the data, that is, of the status information, to the particular vehicle, however only when an irregular event, such as an accident, occurs. In the case of such an event, it may be justified to deviate from the high data privacy requirements, for example to clarify who is responsible.

According to one embodiment, the methods are carried out in an infrastructure unit, a roadside unit (RSU) or a server at least in portions. As was already mentioned, the status information can be received by an RSU in a first step of the method. The RSU can forward the data to a server. Generally, it is also possible to transmit the data directly to the server. Accordingly, the data can be recorded in a memory unit of the RSU and/or of the server. The same applies to the vehicle information received in the third step. If a detection of the vehicle information is provided for in the third step, this can in particular take place via the RSU, for example via a camera of the RSU, as mentioned. The assignment carried out in the fourth step can accordingly be carried out by a control unit of the RSU and/or of the server. The method can thus in particular be carried out outside a vehicle. With such a decentralized data processing operation, only the RSU or the server have to be accordingly configured, for example have corresponding programming and computing capacity, which is more efficient.

In some examples, the status information may relate to the operation of vehicles within a predetermined time period prior to the irregular event and/or is received from vehicles involved in the irregular event. The status information can be continuously received, in particular the status information of all vehicles of the network. However, as mentioned, regular deletion may be provided for, as long as no irregular event occurs. If such an event occurs, the most recently received status information can remain permanently stored so as to enable a subsequent evaluation thereof. Within this meaning, the status information can relate to the operation of vehicles within a predetermined time period prior to the irregular event. It may also be provided that the status information of vehicles involved in the irregular event is received, in particular the status information within a predetermined time period prior to the irregular event. In most instances, not all status information of the trip having taken place prior to the accident is important for the evaluation of the events of the accidents. According to this embodiment, the method is only based on the status information from within a predetermined time period prior to the irregular event, which is more efficient and additionally is also advantageous in terms of data protection since older data is not used.

In some examples, status information of one or more vehicles may be requested in response to the detection or reception of the vehicle information. This method step can in particular be carried out by the RSU and/or the server. If vehicle information, and thus the information that an irregular event has occurred, is received, according to this embodiment the status inquiries of further vehicles of the V2X network are polled, in particular the status information of vehicles not directly involved in the event/accident. For example, the status information of the vehicles passing the accident may also be relevant for clearing up the events of the accident. This status information can also be taken into account during an evaluation of the events of the accident.

In some examples, the status information may relate to a characteristic of an occupant of the vehicle, of cargo of the vehicle, or of the vehicle. According to an embodiment in this regard, the status information related to the vehicle includes trip data, such as the speed, steering angle, brake activation, turn signal activation, data regarding a selected driving mode and/or environmental settings, as was already mentioned. For example, as was already mentioned, it may be relevant for the method, as well as the later evaluation of the events of the accident, whether or not a vehicle involved in the accident shared a relevant characteristic of the occupant, such as “Physician on duty,” or of the cargo, such as fragile cargo. If this has been shared, a potential dangerous driving behavior of the occupant could be assessed differently. The same can apply if cargo has been identified as being relevant for traffic. For the assignment, additionally trip data, such as the speed and steering angle, may be relevant, as has also already been described. Possible vehicle information, such as the end position and the driving direction that the vehicle had just prior to the accident, ideally only match one set of status information, that is, only one specific combination of, for example, speed and steering angle According to one embodiment, the vehicle information may include the point in time and/or location of the irregular event, changes in the speed or driving direction, end positions and/or the driving direction of individual vehicles involved in the irregular event. It can be derived from the vehicle information itself that an irregular event has occurred. It is also possible to receive the information regarding the occurrence of the irregular event in a shared message together with the vehicle information, or independently of the vehicle information. In this way, the method according to some aspects can be triggered in an easy manner.

In some examples, the recorded status information is cyclically deleted, provided no vehicle information is being received or detected. According to this embodiment, the status information recorded in particular in the memory unit of the RSU and/or of the server is thus only permanently stored when vehicle information is received or detected when an irregular event occurs. As mentioned, the memory unit can be configured as a circular buffer for this purpose, in which the stored data is continuously overwritten. If an irregular event occurs, the status information can be transferred into a permanent memory, which can be part of the memory unit. After the vehicle information has been received, at least the last data cycle is preserved, for example the last 15 seconds prior to the accident. In this way, disk space and computing capacity can be saved. In addition, it is conducive for data protection reasons to only store data if the data is required for the evaluation of the irregular event.

In some examples, the set of status information may be stored in a blockchain. In particular, the result of the comparison according to the present disclosure, that is, the assignment of the set of status information to a vehicle, can also be stored in the blockchain. In this way, the data that is important for the evaluation of the accident, the evaluation of which, amongst others, can also have consequences under criminal law, can be stored in a forgery-proof manner.

In examples involving methods of operating a vehicle within a V2X network, status information related to the vehicle is detected. For this purpose, the vehicle can comprise one or more sensors or input devices, for example for entering characteristics of the vehicle driver, of another occupant or of the cargo. The status information is preferably detected in anonymized form, and in particular no identifier that unambiguously identifies the vehicle is assigned to the status information. The status information can be at least buffered in a memory unit of the vehicle.

In a second step, the detected status information is transmitted to an RSU and/or a server of the V2X network by means of a first message, wherein the RSU or the server stores the status information in an anonymized manner. The first message can accordingly prompt the RSU or the server to record the status information in anonymized form. The transmission can also be carried out indirectly via the RSU to the server. The transmission can also be carried out via WLANp or Cellular V2X here. After the status information has been transmitted, the buffer of the vehicle can be cleared. According to one embodiment, the transmission of the status information to the RSU and/or the server already takes place in anonymized form. This is especially secure from a data protection perspective.

In some examples, the vehicle may determine the occurrence of an irregular event involving the vehicle. For this purpose, the sensors of the vehicle can be utilized. In particular, a spontaneous change of status information, for example of the speed or of a steering angle of the vehicle itself, can be interpreted as an occurrence of an irregular event. The involvement of the vehicle can be a direct involvement, during which the vehicle itself, for example, incurs damage, but also an indirect involvement, during which the vehicle observes an accident of another vehicle of the V2X network. According to one embodiment, the vehicle information can, for example, relate to a different vehicle. The vehicle detects vehicle information and associates the same with the irregular event, that is, in particular the accident. If the vehicle is directly involved in the accident, the vehicle can thus, for example, associate the end position thereof and the driving direction thereof just prior to the accident as vehicle information with the accident.

In some examples, this vehicle information may be transmitted to an RSU and/or a server of the V2X network to assign a set of status information to a vehicle involved in the irregular event, based on a comparison between the status information and the vehicle information. Several, or all, available sets of status information can in each case be assigned to a vehicle involved in the irregular event. The transmission can take place using a second message. The second message can accordingly prompt the RSU or the server to assign a set of status information to the vehicles involved in the irregular event, based on a comparison between the status information and the vehicle information. If the vehicle itself was directly involved in the accident, it is thus possible to assign also the set of status information stemming from the vehicle to the vehicle in the above-described manner, despite the data being anonymized. The transmission of the vehicle information can take place in the same manner as the above-described transmission of the status information. Accordingly, the vehicle thus detects and transmits status information as well as, when an irregular event occurs, vehicle information that allow the set of status information belonging to the vehicle to be assigned to this vehicle, despite the data being anonymized. With respect to the assignment, reference is also made to the above description of the first aspect.

Turning to FIG. 1, the drawing shows a traffic situation (or "event" or "occurrence") at an intersection with a first vehicle 10, a second vehicle 20 and a third vehicle 30. In this example, the first vehicle 10 veered off the lane while turning and collided with the third vehicle 30, so that the vehicles 10, 30 are directly involved in an accident as an irregular event. The second vehicle 20 is not directly involved in the accident, however has observed it. While driving, the vehicles 10, 20, 30 detected status information, in particular driving data, such as the speed, steering angle, brake activation and/or turn signal activation, by way of vehicle-internal sensors and transmitted this information to a roadside unit (RSU) 50 via wireless data transmission, wherein the RSU 50 or, after forwarding, a server 100 has recorded the received status information in a memory unit in anonymized form. As a result, a set of status information is available for each of the vehicles. Since the status information is anonymized, however, it is not known which set of status information belongs to which vehicle. However, an assignment of the status information to the particular vehicles involved in the accident is necessary to clarify the events of the accident.

Figure 2:
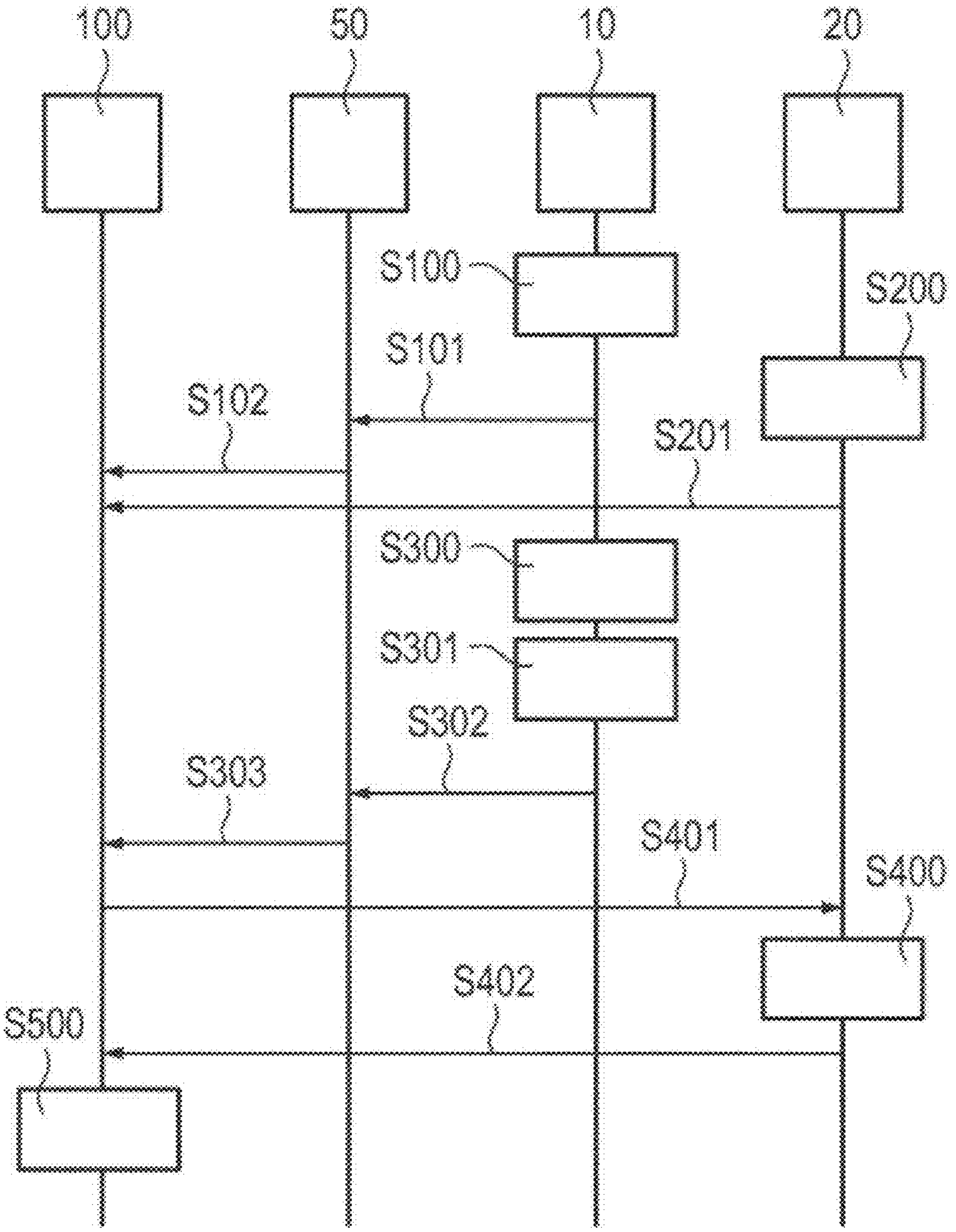
FIG. 2 shows a schematic illustration of the communication between vehicles and an RSU, according to some aspects of the present disclosure.

FIG. 2 shows a schematic illustration of the communication between the vehicles 10, 20 and the RSU 50 according to the method according to aspects of the present disclosure for storing and evaluating status information detected within a V2X network. FIG. 2 shows a server 100, an RSU 50, the first vehicle 10, and the second vehicle 20. In S100, the vehicle 10 creates first status information and transmits it in S101, S102 via the RSU 50 to the server 100.

In step S200, the vehicle 20 creates second status information and transmits it directly to the server 100. The RSU 50 and the server 100 record this status information in the memory units thereof in a step which is not shown here, wherein cyclical deletion of the data may be provided.

In S300, the vehicle 10 establishes an irregular event, namely the accident apparent in FIG. 1 in which the vehicle itself is involved, and in S301 ascertains first vehicle information associated with the event, for example its own trajectory information prior to the accident, and transmits this information via the RSU 50 to the server 100 in S302, S303. Likewise, the vehicle 20, which is also directly involved in the accident, can transmit vehicle information in a corresponding manner to the RSU 50 and/or the server 100.

In S401, the server 100 requests further vehicle information, for example by way of a broadcast message including information about the time and location of the accident and the request for further information. The vehicle 20 receives this message, establishes that it was in the vicinity of the location of the accident at the time of the accident, and in step S400 creates second vehicle information, for example based on exterior sensor data and about other involved vehicles. In step S402, the second vehicle 20 transmits this information to the server 100, for example via a mobile communication network.

In step S500, the server 100 compares all the status information to the received vehicle information so as to ascertain which of the sets of status information now available to the server 100 belongs to which of the vehicles involved in the accident. Despite the anonymized storage of the data, an assignment of, in particular, the first set of status information stemming from the first vehicle 10 to the first vehicle 10 and of the second set of status information stemming from the third vehicle 30 to the third vehicle 30 is carried out.

Aspects of the present disclosure thus only allows status information present in anonymized form to be assigned to the particular vehicle from which the information stems, at least when an irregular event occurs, such as an accident. Thus far, such an assignment has only been possible by means of an unambiguous identifier which, however, is to be dispensed with according to some aspects for data protection reasons. Even though the status information is generally processed in a data protection-compliant manner, the present disclosure allows the status information to be assigned to the particular vehicle when an accident occurs in which clarifying the cause and responsibility may outweigh the protection of the data of those involved.

Figure 3:
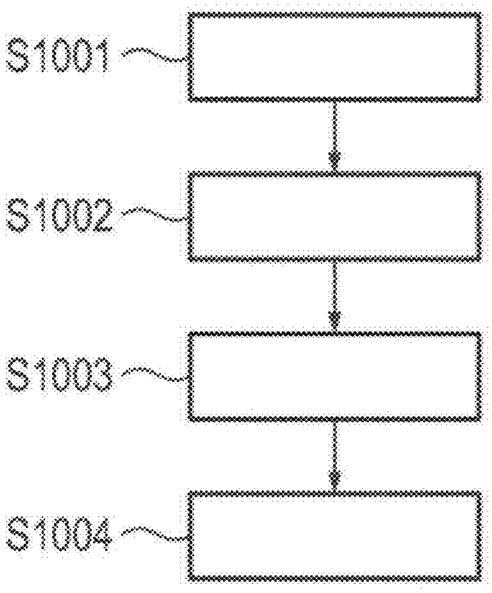
FIG. 3 shows a schematic illustration of a method carried out by an RSU, according to some aspects of the present disclosure.

FIG. 3 schematically shows a method according to aspects of the present disclosure for storing and evaluating status information detected within a V2X network by means of the RSU 50 or the server 100, wherein, in a first step S1001, status information of a plurality of vehicles is received by the RSU 50 or the server 100, in a second step S1002, the received status information is recorded in anonymized form in a memory unit of the RSU 50 or of the server 100, in a third step S1003, vehicle information about vehicles involved in an irregular event is detected or received by the RSU 50 or the server 100, and in a fourth step S1004, at least one set of status information about at least one vehicle involved in the irregular event is assigned by a control unit of the RSU 50 or the server 100 based on a comparison between the status information and the vehicle information.

Figure 4:
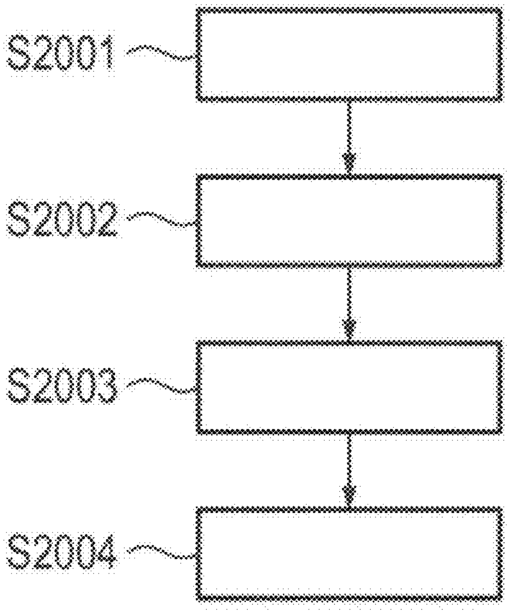
FIG. 4 shows a schematic illustration of a method, carried out by a vehicle, according to some aspects of the present disclosure.

FIG. 4 schematically shows a method according aspects of the present disclosure of one of the vehicles 10, 20, 30 within a V2X network, wherein, in a first step S2001, status information related to the vehicle 10, 20, 30 is detected, in a second step S2002, the detected status information is transmitted to the RSU 50 and/or the server 100 of the V2N network by means of a first message so as to be recoded in anonymized form, in step S2003, an irregular event with involvement of the particular vehicle 10, 30 is ascertained, and in step 2004, vehicle information associated with the irregular event is transmitted to the RSU 50 and/or the server 100 of the V2X network, so as to assign a set of status information to the vehicles 10, 20, 30 involved in the irregular event based on a comparison between the status information and the vehicle information.

Figure 5:
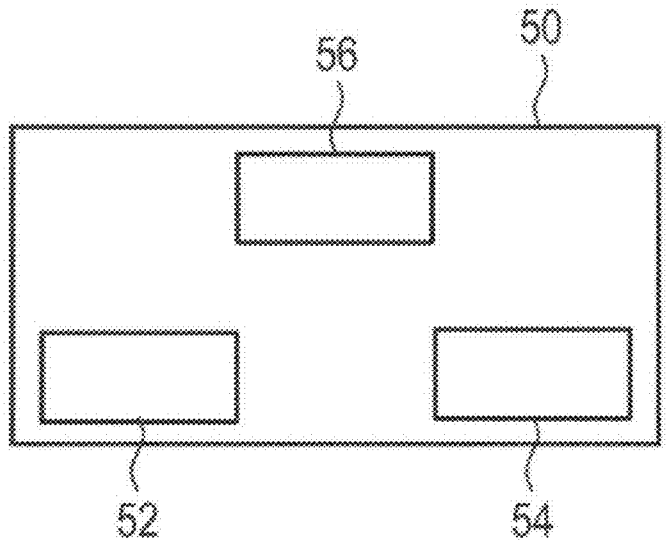
FIG. 5 shows a schematic illustration of elements of an RSU, according to some aspects of the present disclosure.

FIG. 5 schematically shows the RSU 50 including elements for the method according to aspects of the present disclosure. In this example, the RSU 50 comprises a communication unit 52 for the data communication within the V2X network, a memory unit 54 for recording data, a control unit 56 configured to activate the communication unit 52 for receiving status information of a plurality of vehicles 10, 20, 30, to record the received status information in the memory unit 54 in anonymized form, to detect or receive vehicle information about vehicles 10, 20, 30 involved in an irregular event, and to assign a set of status information to the vehicles 10, 30 involved in the irregular event based on a comparison of the status information to the vehicle information. As an alternative or in addition, the server 100 can also be designed accordingly.

Figure 6:
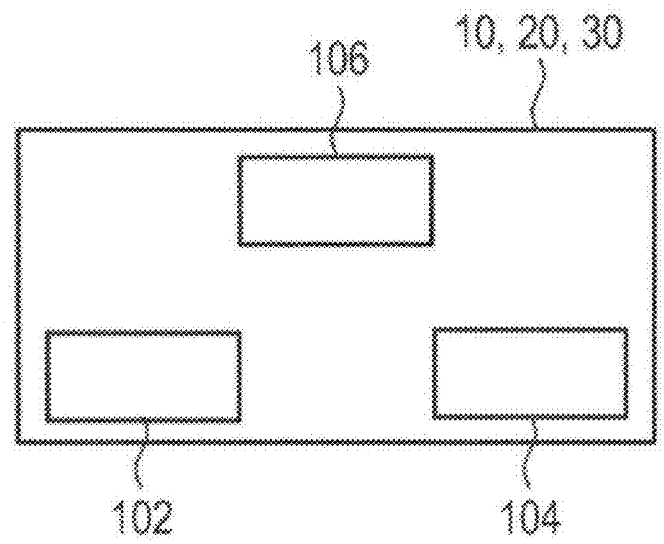
FIG. 6 shows a schematic illustration of the elements of a vehicle, according to some aspects of the present disclosure.

FIG. 6 schematically shows the elements of the vehicles 10, 20, 30 for the method according to aspects of the present disclosure. The vehicles 10, 20, 30 comprise a communication unit 102 for the data communication within the V2X network, a sensor unit 104 for detecting status information and vehicle information, a control unit 106 configured to activate the sensor unit 104 for detecting status information related to the vehicle 10, 20, 30 and vehicle information, to active the communication unit 102 for transmitting the detected status information to the RSU 50 or the server 100 by means of a first message, to determine an irregular event with involvement of the vehicle 10, 20, 30, and to activate the communication unit 102 for transmitting vehicle information associated with the irregular event to the RSU 50 or the server 100 so as to assign a set of status information to at least one of the vehicles 10, 20, 30 involved in the irregular event, based on a comparison between the status information and the vehicle information.

LIST OF REFERENCE NUMERALS

10 first vehicle
20 second vehicle
30 third vehicle
50 RSU
52 communication unit
54 memory unit
56 control unit
102 communication unit
104 sensor unit
106 control unit
S101-S402 method steps
S1001-S1004 method steps
S2001-S2004 method steps

The invention claimed is:

1. A method for storing and evaluating status information recorded within a vehicle-to-x (V2X) network, comprising:
- receiving status information of a plurality of vehicles;
- recording the received status information in a memory unit in anonymized form, and removing an identifier that associates the status information to the associated vehicle such that the recorded status information cannot be directly assigned to a vehicle;
- detecting or receiving vehicle information about vehicles involved in an irregular event; and
- assigning a set of status information to one of the vehicles involved in the irregular event by comparing the anonymized recorded status information with the vehicle information to determine that the set of status information corresponds to said one of the vehicles involved in the irregular event.

2. The method according to claim 1, wherein assigning the set of status information comprises assigning the set of status information in an infrastructure unit, a roadside unit (RSU) or a server.

3. The method according to claim 1, wherein the status information
- relates to the operation of vehicles within a predetermined time period prior to the irregular event; and/or
- is received from vehicles involved in the irregular event.

4. The method according to claim 1, further comprising requesting the status information from one or more vehicles in response to the detection or reception of the vehicle information.

5. The method according to claim 1, wherein the status information comprises characteristic data relating to at least one of (i) a vehicle, (ii) an occupant of the vehicle, (iii) cargo of the vehicle.

6. The method according to claim 5, wherein the status information relating to the vehicle comprises trip data, including one or more of speed, steering angle, brake activation, turn signal activation, data regarding a selected driving mode and/or environmental settings.

7. The method according to claim 1, wherein the vehicle information comprises a point in time and/or location of the irregular event, changes in speed or driving direction of the vehicle, end positions and/or a driving direction of individual vehicles involved in the irregular event.

8. The method according to claim 1, wherein the recording the received status information comprises cyclically deleting the received status information, provided no vehicle information is being received or detected.

9. The method according to claim 1, wherein assigning the set of status information comprises storing the set of status information in a blockchain.

10. A computer apparatus, comprising one or more of an infrastructure unit, a roadside unit (RSU) or a server, communicatively coupled to a vehicle-to-x (V2X) network, comprising:
- a communication unit, configured to communicate data with the V2X network;
- a memory, operatively coupled to the communication unit, the memory being configured to record data; and
- a control unit, operatively coupled to the memory, the control unit being configured to:
  - receive status information of a plurality of vehicles via the communication unit;
  - record the received status information in the memory in anonymized form, and remove an identifier that associates the status information to the associated vehicle such that the recorded status information cannot be directly assigned to a vehicle;
  - detect or receive vehicle information about vehicles involved in an irregular event; and
  - assign a set of status information to one of the vehicles involved in the irregular event by comparing the anonymized recorded status information with the vehicle information to determine that the set of status information corresponds to said one of the vehicles involved in the irregular event.

11. The computer apparatus of claim 10, wherein the status information
- relates to the operation of vehicles within a predetermined time period prior to the irregular event; and/or
- is received from vehicles involved in the irregular event.

12. The computer apparatus of claim 10, wherein the control unit is configured to request the status information from one or more vehicles in response to the detection or reception of the vehicle information.

13. The computer apparatus of claim 10, wherein the status information comprises characteristic data relating to at least one of (i) a vehicle, (ii) an occupant of the vehicle, (iii) cargo of the vehicle.

14. The computer apparatus of claim 13, wherein the status information relating to the vehicle comprises trip data, including one or more of speed, steering angle, brake activation, turn signal activation, data regarding a selected driving mode and/or environmental settings.

15. The computer apparatus of claim 10, wherein the vehicle information comprises a point in time and/or location of the irregular event, changes in speed or driving direction of the vehicle, end positions and/or a driving direction of individual vehicles involved in the irregular event.

16. The computer apparatus of claim 10, wherein the control unit is configured to cyclically delete the received status information, provided no vehicle information is being received or detected.

17. A vehicle configured to communicate in a vehicle-to-x (V2X) network, comprising:

a communication unit for data communication within the V2X network;

a sensor unit for detecting status information and vehicle information; and a control unit, configured to:

activate the sensor unit for detecting status information related to the vehicle and vehicle information;

activate the communication unit for transmitting the detected status information to an infrastructure unit, a roadside unit (RSU) and/or a server of the V2X network utilizing a message;

determine an irregular event for the vehicle; and transmit, via the communication unit, vehicle information associated with the irregular event to the RSU and/or to the server of the V2X network to enable assignment of a set of status information to one of the vehicles involved in the irregular event by comparing anonymized recorded status information with the vehicle information to determine that the set of status information corresponds to said one of the vehicles involved in the irregular event.

18. The vehicle according to claim 17, wherein the status information is transmitted in anonymized form to the RSU or the server.

19. The vehicle according to claim 17, wherein the vehicle information relates to another vehicle.

20. The vehicle according to claim 17, wherein the status information comprises characteristic data relating to at least one of (i) a vehicle, (ii) an occupant of the vehicle, (iii) cargo of the vehicle.

* * * * *